Nov. 21, 1967 A. V. L. C. DEBRIE 3,353,442
CINEMATOGRAPH APPARATUS
Filed Dec. 17, 1964
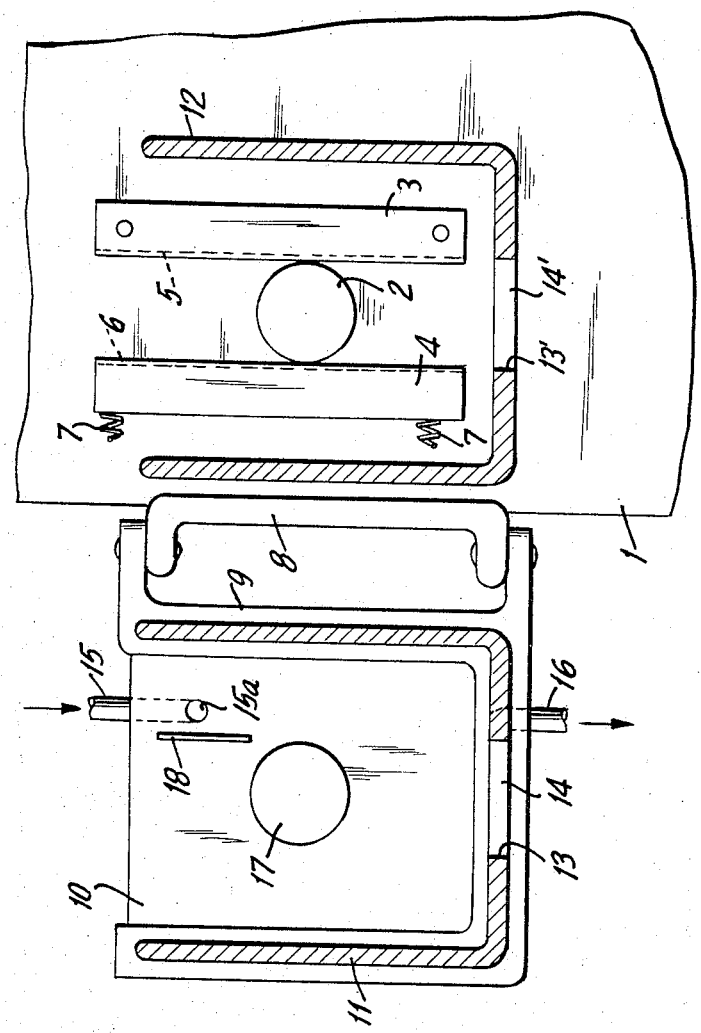
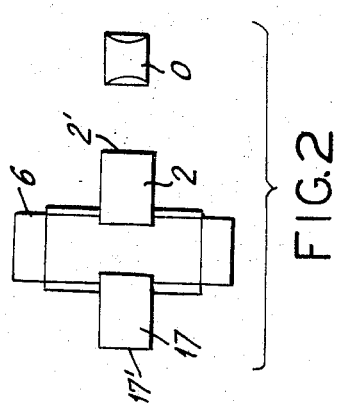
INVENTOR.
ANDRÉ VICTOR LÉON CLÉMENT DEBRIE
BY
McGlew & Toren
ATTORNEYS 3,353,442
CINEMATOGRAPH APPARATUS
André Victor Léon Clément Debrie, Paris, France, assignor to Societe des Etablissements André Debrie, Paris, France, a company of France
Filed Dec. 17, 1964, Ser. No. 419,161
Claims priority, application France, Apr. 27, 1964, 972,438; July 28, 1964, 983,297
5 Claims. (Cl. 88—24)

This invention relates to optical printers.

It is known that when a reproduction of a film is made, more particularly in an optical printer, it is advisable to eliminate the flaws appearing on the negative film so as to avoid them being reproduced on the positive film. These flaws may be constituted by accidental streaks or scratches or other damage appearing in the form of hollows either in the gelatine of the film or in its support.

To this end, the hollows due to the flaws are filled by means of a liquid the refractive index of which is sufficiently close to that of the gelatine or that of the support. Various devices have already been proposed for passing the negative film between two sheets or films of this liquid at the level of the picture gate or aperture. In particular, it is possible to combine a guide track for the film in front of the picture gate, this track being of the type having lateral grooves of V-shaped cross-section, with two transparent optical plates leaving a gap very much greater than the thickness of the film between them. These devices, however, are difficult to construct and the use thereof may also present difficulties.

The present invention has for its object an optical printer which, in one respect, ensures satisfactory elimination of the flaws in the negative film during optical reproduction, while permitting easier placing in position of the film.

To this end, according to the invention, one of the optical plates is mounted in the fixed panel carrying the guide track for the film and the other optical plate is mounted on a hinged shutter adapted to be applied and clamped against the fixed panel, while ensuring a suitable volume of liquid between the fixed panel and the hinged shutter, which is recessed for this purpose, sealing means being provided on the one hand where the hinged shutter makes contact with the fixed panel and on the other hand at the passage for the film at the bottom of the space defined by the said panel and the recessed shutter in the closed position.

According to one embodiment of the invention, the liquid serving to fill the hollows due to the flaws is introduced into the said space in the vicinity of the upper part of the hinged shutter, while an outlet is provided at the level of the sealing means at the lower part of the shutter.

However, with relatively thin parallel-faced plates having, for example, a thickness of two millimetres, optical transfer of the accidental irregularities present on the dry outer faces of these plates occurs in practice, it being possible for these irregularities to be constituted by deposits of dust, grease, scratches and so forth. Thus, while the transfer of the flaws present on the negative film to be copied to the positive film is eliminated, the transfer of the external irregularities present on the device serving to eliminate the first-mentioned defects is not avoided.

According to a special feature of the invention which can be combined with advantage with the above-described construction, this last-mentioned drawback can be remedied. To this end, the dry outer faces of the optical plates are carried back in such manner that they are located outside the depth of field of the lens used for reproduction. For example, it is possible to use thick parallel-faced plates instead of the thin parallel-faced plates usually employed. Moreover, the distance between the inner faces of the optical plates is ordinarily of the order of a few tenths of a millimetre. However, the applicant has determined that better results are obtained when this distance is increased to a size of the order of one centimetre.

These different features of the invention, as well as others, will appear in the course of the following description given with reference to the accompanying drawings in which:

FIGURE 1 shows part of an optical printer according to the invention, and

FIGURE 2 is a detail view at right angles to FIGURE 1.

In FIGURE 1, the reference 1 designates the panel of the optical printer incorporating the improvements according to the invention. Formed in this panel is a picture gate or aperture which is closed by an optical plate 2 at right angles to the optical axis of the lens O of the printer. The panel carries a guide track for the film which is formed by two bars 3 and 4 framing the picture gate and having V-shaped grooves 5 and 6, respectively, cut in them. One of the bars is fixed to the panel, while the other can be shifted towards the first bar, being subjected to the action of springs shown at 7.

To a suitable bracket 8 carried by the panel 1 there is articulated a hinged shutter 9 which is recessed at 10. The edges of this shutter are provided with sealing means 11 designed to co-operate with a raised portion 12 provided on the fixed panel in order to take account of the thickness of the bars 3, 4. Means (not shown) enable the shutter to be clamped against the fixed panel in the closed position. More particularly, in order to ensure better contact tightness, the axis of articulation of the shutter 9 on the bracket 8 may extend through slots formed in either of the parts so as to permit both a movement of translation and a rotary movement of the shutter with respect to the fixed panel.

The hinged shutter is recessed at the bottom at 13, while the raised portion 12 of the panel is recessed at 13' to form a passage permitting the film to run through. This passage is equipped with suitable sealing means 14, 14'.

Moreover, an inlet for liquid is provided in the hinged shutter at 15, while an outlet 16 receives the liquid at the level of the sealing means 14, 14'.

The hinged shutter carries a second optical ⅔ plate 17 located opposite the first plate 2 when the said shutter is closed. It is ensured that there is always sufficient liquid in the space defined by the shutter and the panel between the two plates 2 and 17. To this end, for example, it is possible to use a system similar to that employed in constant-level tanks or cisterns. In order to avoid the presence of bubbles or other impurities between the two plates, it may be advantageous to position a screen or filter such as 18 between the plates and the inlet orifice 15a for the liquid.

According to a feature of the invention, the dry outer faces 2' and 17' of the optical plates are carried back in such manner that they are located outside the depth of field of the lens O used for reproduction. For example, it is possible to use thick parallel-faced plates instead of the thin parallel-faced plates previously used.

In all cases the invention has the main advantage of facilitating the placing in position of the film, while effectively ensuring the elimination of the flaws present on the negative film passing through the guide track shown, owing to the interposition of sheets or films of suitable liquid at the very place where the image of the film is formed. Moreover, it is also possible to eliminate the flaws present on the outer faces of the optical system used.

What is claimed is:

1. A liquid immersion optical printer for film reproduction comprising, in combination, a relatively fixed panel; a shutter cooperable with said panel to define therewith an upwardly extending recess; means hingedly mounting said shutter for swinging movement toward and away from said panel, said shutter being clamped against said panel in the closed, recess-forming position; sealing means interposed between said panel and said shutter in such closed position and peripherally defining said recess; a liquid inlet in said shutter opening into said recess, for filling the latter with a liquid adapted to eliminate flaws in the film; a liquid outlet in said shutter opening into said recess; said sealing means being formed to define a liquid-tight passage for the film to enter said recess; first and second optical plates on said panel and on said shutter, respectively, aligned in facing spaced relation in such closed position to define a film passage therebetween; and means guiding the film to pass from said liquid-tight passage through said recess and between said optical plates, whereby the film runs through the liquid in said recess.

2. A liquid immersion optical printer, as claimed in claim 1, wherein said liquid inlet is disposed adjacent the upper part of said shutter, said liquid outlet being at the level of said sealing means at the lower part of said shutter.

3. A liquid immersion optical printer, as claimed in claim 2, including filtering means interposed between said liquid inlet and said optical plates.

4. A liquid immersion optical printer, for film reproduction, comprising, in combination, a relatively fixed panel; a shutter cooperable with said panel to define therewith an upwardly extending recess; means hingedly mounting said shutter for swinging movement toward and away from said panel, said shutter being clamped against said panel in the closed, recess-forming position; sealing means interposed between said panel and said shutter in such closed position and peripherally defining said recess; a liquid inlet in said shutter opening into said recess, for filling the latter with a liquid adapted to eliminate flaws in the film; a liquid outlet in said shutter opening into said recess; said sealing means being formed to define a liquid-tight passage for the film to enter said recess; a reproducing lens exterior to said panel and said shutter; first and second optical plates on said panel and on said shutter, respectively, aligned in facing spaced relation along the optical axis of said reproducing lens in such closed position, said optical plates having inner faces facing each other adjacent opposite sides of the film, in such closed position, to define a film passage therebetween, and having outer faces located in respective planes outside the depth of field of said reproducing lens, whereby the optical transfer of irregularities present on the dry outer faces of said plates is avoided in reproduction of the film; and means guiding the film to pass from said liquid-tight passage through said recess between said optical plates, whereby the film runs through the liquid in said recess.

5. A liquid immersion optical printer, as claimed in claim 4, wherein said optical plates are constituted by thick parallel-faced plates.

References Cited

UNITED STATES PATENTS

| | | | |
|---|---|---|---|
| 2,855,822 | 10/1958 | Fitter et al. | 88—24 |
| 2,890,621 | 6/1959 | Suits | 88—24 |

NORTON ANSHER, *Primary Examiner.*

R. A. WINTERCORN, *Assistant Examiner.*